US008145127B2

(12) United States Patent
Nory et al.

(10) Patent No.: US 8,145,127 B2
(45) Date of Patent: Mar. 27, 2012

(54) METHOD AND APPARATUS FOR TRANSMIT POWER CALIBRATION IN A FREQUENCY DIVISION MULTIPLEXED WIRELESS SYSTEM

(75) Inventors: Ravikiran Nory, Grayslake, IL (US); Edgar Fernandes, Winchester (GB); Robert Love, Barrington, IL (US); Vijay Nangia, Algonquin, IL (US); Dale Schwent, Schaumburg, IL (US); Kenneth A. Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1085 days.

(21) Appl. No.: 11/838,536

(22) Filed: Aug. 14, 2007

(65) Prior Publication Data

US 2009/0047902 A1    Feb. 19, 2009

(51) Int. Cl.
*H04B 7/185* (2006.01)
(52) U.S. Cl. ...... 455/13.4; 455/522; 455/69; 455/127.5; 455/63.1; 370/318; 713/320
(58) Field of Classification Search ............. 455/13.4, 455/522, 69, 127.1–127.5, 88, 63.1, 422.1; 370/318, 335; 713/320
See application file for complete search history.

(56) References Cited

U.S. PATENT DOCUMENTS

| | | | |
|---|---|---|---|
| 5,287,555 A | | 2/1994 | Wilson et al. |
| 6,594,251 B1 * | | 7/2003 | Raissinia et al. ............ 370/347 |
| 6,788,950 B1 * | | 9/2004 | Raissinia et al. ............ 455/522 |
| 2003/0002452 A1 | | 1/2003 | Sahota |
| 2005/0014524 A1 * | | 1/2005 | Lott et al. ............ 455/522 |
| 2006/0120404 A1 * | | 6/2006 | Sebire et al. ............ 370/469 |
| 2007/0058605 A1 * | | 3/2007 | Meylan et al. ............ 370/346 |

FOREIGN PATENT DOCUMENTS

| | | |
|---|---|---|
| EP | 1566887 A2 | 8/2005 |
| WO | 2006/134945 A1 | 12/2006 |
| WO | 2007/052972 A1 | 10/2007 |

OTHER PUBLICATIONS

International Search Report issued Feb. 12, 2009, in connection with Related PCT Application No. PCT/US2008/073042.
International Preliminary Report on Patentability dated Feb. 25, 2010.

(Continued)

*Primary Examiner* — Shaima Q Aminzay
(74) *Attorney, Agent, or Firm* — Matthew C. Loppnow; Roland K. Bowler, II (57) ABSTRACT

The present disclosure describes a method and apparatus for transmit power calibration in a frequency division multiplexed wireless system (100). The method may include receiving (315) an uplink scheduling grant at a user equipment (120), establishing (320) a desired power level based on at least the uplink scheduling grant, and setting (325) hardware power settings based on the desired power level. The method may also include transmitting (330) data in a first subframe at a first power level based on the hardware power settings, measuring (335) the first power level in the first subframe, and determining (340) a difference between the desired power level and the measured first power level. The method may additionally include modifying (345) the hardware power settings based on the difference and transmitting (350) at a second power level based on the modified hardware power settings in a next transmission corresponding to the transmission in the first subframe.

20 Claims, 6 Drawing Sheets

OTHER PUBLICATIONS

Interdigital Communications Corporation; E-UTRA Uplink Power Control Proposal and Evaluation; 3GPP TSG RAN WG1; R1-072781; Orlando, FL USA; Jun. 25-29, 2007.
Motorola; Uplink Power Control: Details; 3GPP TSG RAN1; R1-072675; Orlando, FL USA; Jun. 25-29, 2007.
Siemens, Nokia; Uplink Power Control; 3GPP TSG RAN WG1; R1-071694; St. Julians, Malta; Mar. 26-30, 2007.
Interdigital Communications Corporation; Uplink Power Control Proposal for E-UTRA with Overhead Analysis; 3GPP; R1-071463; St. Julians, Malta France; Mar. 26-30, 2007.
3GPP; 3rd Generation Partnership Project; Technical Specification Group Radio Access Network; Physical layer aspects for evolved Universal Terrestrial Radio Access (UTRA) (Release 7); 3GPP TR 25.814 V7.1.0; XP-002511692; (Sep. 2006).
International Search Report issued Feb. 16, 2009, in connection with Related PCT Application No. PCT/US2008/073037.
Motorola; Effect of UE transmit power adjustments on EUTRA UL; 3GPP TSG RAN1 #50; R1-07xxxx; Athens Greece; Aug. 20-29, 2007.
Motorola; UE Transmit Power Accuracy & Calibration; 3GPP TSG RAN1#50; R1-07xxxx; Athens Greece; Aug. 20-24, 2007.
NTI Docomo, Fujitsu, Mitsubishi Electric, Toshiba Corporation; Intra-cell Transmission Power Control Scheme in E-UTRA Uplink; 3GPP TSG RAN WG1 Meeting #49bis; R1-072944; Orlando, USA, Jun. 25-29, 2007.
Nokia Siemens Networks, Nokia; UL Sounding Reference Signal; 3GPP TSG RAN WG1 #49bis; R1-072988; Orlando, USA, Jun. 25-29, 2007.
Catt, Ericsson, LGE, Motorola, Nokia, Nokia-Siemens, Nortel, NTT DoCoMo, Orange, Panasonic, Philips, Qualcomm, Samsung, Sharp, TI, Vodafone; Way Forward on Power Control of PUSCH; 3GPP TSG-RAN WG1 #49-bis; R1-073224; Orlando, USA; Jun. 25-29, 2007.

\* cited by examiner

METHOD AND APPARATUS FOR TRANSMIT POWER CALIBRATION IN A FREQUENCY DIVISION MULTIPLEXED WIRELESS SYSTEM

CROSS-REFERENCE TO RELATED APPLICATIONS

This application is related to application entitled "Method and Apparatus for Transmit Power Calibration in a Frequency Division Multiplexed Wireless System," U.S. application Ser. No. 11/838,517, filed on even date herewith and commonly assigned to the assignee of the present application, which is hereby incorporated by reference.

BACKGROUND

1. Field

The present disclosure is directed to a method and apparatus for transmit power calibration in a wireless system, and more particularly to modifying transmit power settings based on a desired power level.

2. Introduction

Presently, efforts are underway to standardize uplink power control for Third Generation Partnership Project (3GPP) Long Term Evolution (LTE), also referred to as Evolved Universal Terrestrial Radio Access (EUTRA). While exact implementation details are yet to be finalized, it is generally understood that terminals, such as user equipment (UE), in a EUTRA network will have to transmit at at distinct power levels that are determined by a specific power control formula. It is also generally understood that, for each terminal, the power control formula attempts to maintain per subcarrier power, such as the power spectral density (PSD) of the signal received at the base station, at a desired level. If the received PSD has to be kept at a particular level, and the number of subcarriers allocated to a UE is significantly different in each subframe, then total transmit power of each EUTRA UE will change considerably from subframe to subframe. Maintaining transmit power accuracy, with rapidly changing transmission bandwidth and frequency, such as would occur where a separate sets of subcarriers may be allocated to a UE in different subframes, will be a significant challenge for UE hardware implementation. Without any mitigation mechanisms in place, UEs in the EUTRA network will make significant errors in the transmit power which will result in a considerable loss in spectral efficiency.

Thus, there is a need for a method and apparatus for transmit power calibration in a frequency division multiplexed wireless system.

SUMMARY

The present disclosure describes a method and apparatus for transmit power calibration in a frequency division multiplexed wireless system. The method may include receiving an uplink scheduling grant at a user equipment in a frequency division multiplexed wireless system, establishing a desired power level based on at least the uplink scheduling grant, and setting hardware power settings based on the desired power level. The method may also include transmitting data in a first subframe at a first power level based on the hardware power settings, measuring the first power level in the first subframe, and determining a difference between the desired power level and the measured first power level. The method may additionally include modifying the hardware power settings based on the determined difference and transmitting at a second power level based on the modified hardware power settings in a next transmission corresponding to the transmission in the first subframe.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
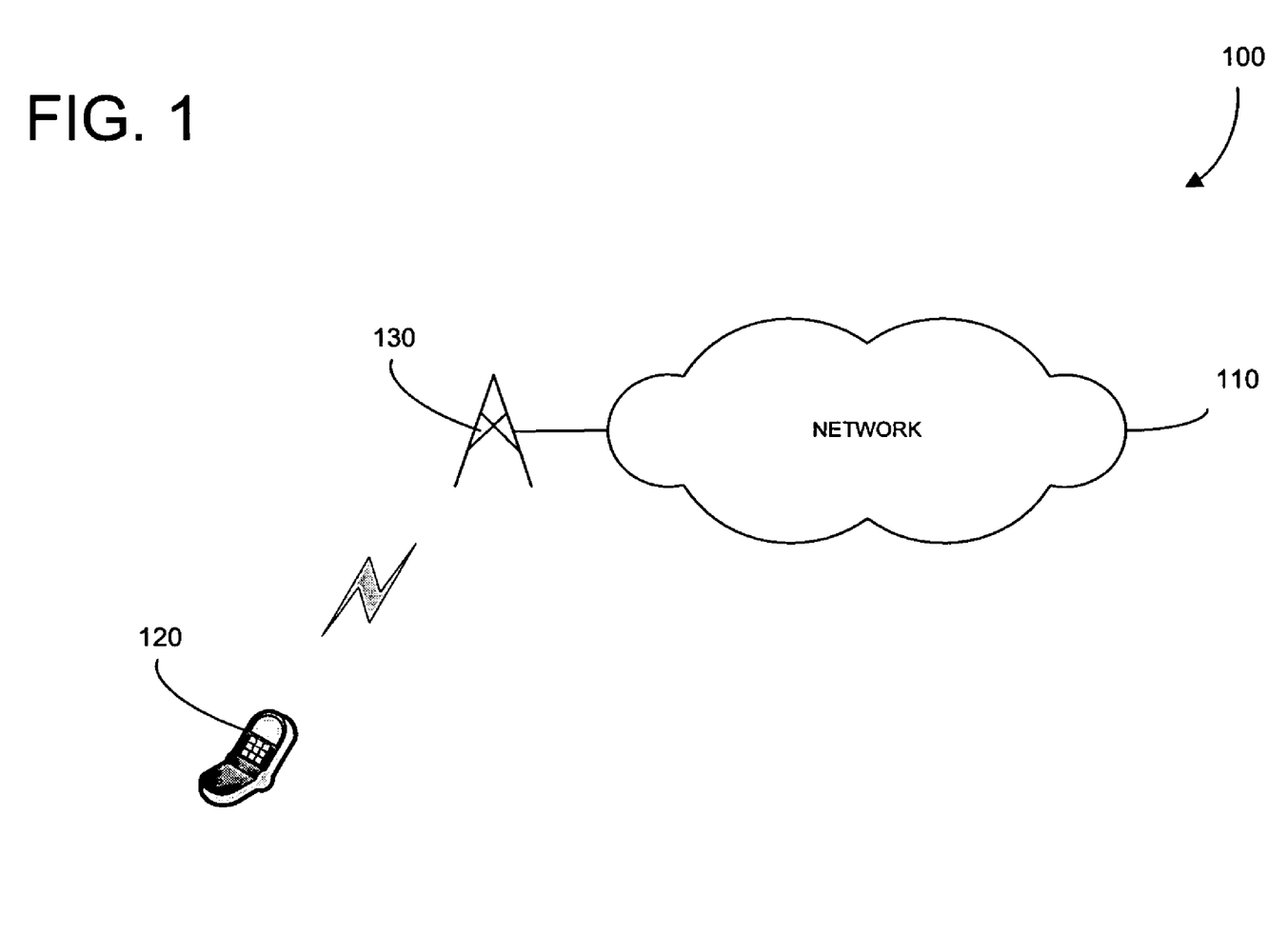
FIG. 1 illustrates an exemplary diagram of a system in accordance with one possible embodiment of the disclosure.

FIG. 1 is an exemplary diagram of a system 100 according to one embodiment. The system 100 can include a network 110, a terminal 120, and a base station 130. The terminal 120 may be an apparatus such as a wireless communication device, user equipment, a wireless telephone, a cellular telephone, a personal digital assistant, a pager, a personal computer, a selective call receiver, or any other device that is capable of sending and receiving communication signals on a wireless network.

The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, a satellite communications network, and other like communications systems. For example, the network 110 can be a frequency division multiplexed wireless system. The frequency division multiplexed wireless system can use subframes comprising a plurality of symbols where multiple users of terminals can transmit in a single subframe at different frequencies. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

In operation, the terminal 120 can receive an uplink scheduling grant from the base station 130. The terminal 120 can then establish a desired power level based on at least the uplink scheduling grant. The terminal 120 can then set hardware power settings based on the desired power level. The terminal 120 can then transmit data, in a first subframe at a first power level based on the hardware power settings without any calibration based on a dedicated power calibration waveform. For example, the terminal does not need to use a dedicated power calibration waveform. The terminal 120 can then measure the first power level in the first subframe. The terminal 120 can save hardware power settings related to the first power level. The terminal 120 can then determine a difference between the desired power level and the measured first power level. The terminal 120 can then modify the saved hardware power settings based on the difference. The terminal 120 can then transmit at a second power level based on the modified hardware power settings in a next transmission corresponding to the transmission in the first subframe by being based on substantially similar characteristics corresponding to the desired power level.

For example, the terminal 120 can transmit at a new power level without any calibration for an entire duration of a subframe. Due to lack of calibration, transmit power for that subframe may be erroneous (actual power level equal to a desired power level $P_d$+a differential power $\Delta$, where $\Delta$, which is also referred to herein as delta, can be positive or negative). However, while making the transmission, the terminal 120 hardware can measure the actual power used ($P_d$+$\Delta$) and save the corresponding hardware settings. If the terminal 120 has to retransmit in a subsequent sub-frame, it can then use the saved hardware settings with slight modifications to correct for the error ($\Delta$) and retransmit at a power closer to the desired power level $P_d$, or a related power level. This can be effective in a case where the resources allocated for the retransmission are identical to, or closely related to, those allocated for the initial transmission. This may occur, for example, when a Hybrid Automatic Request (HARQ) operation is synchronous and non-adaptive. In this method, as the terminal 120 is transmitting with a more accurate power level at least during the retransmission, system performance can be better than that achieved using no calibration.

Figure 2:
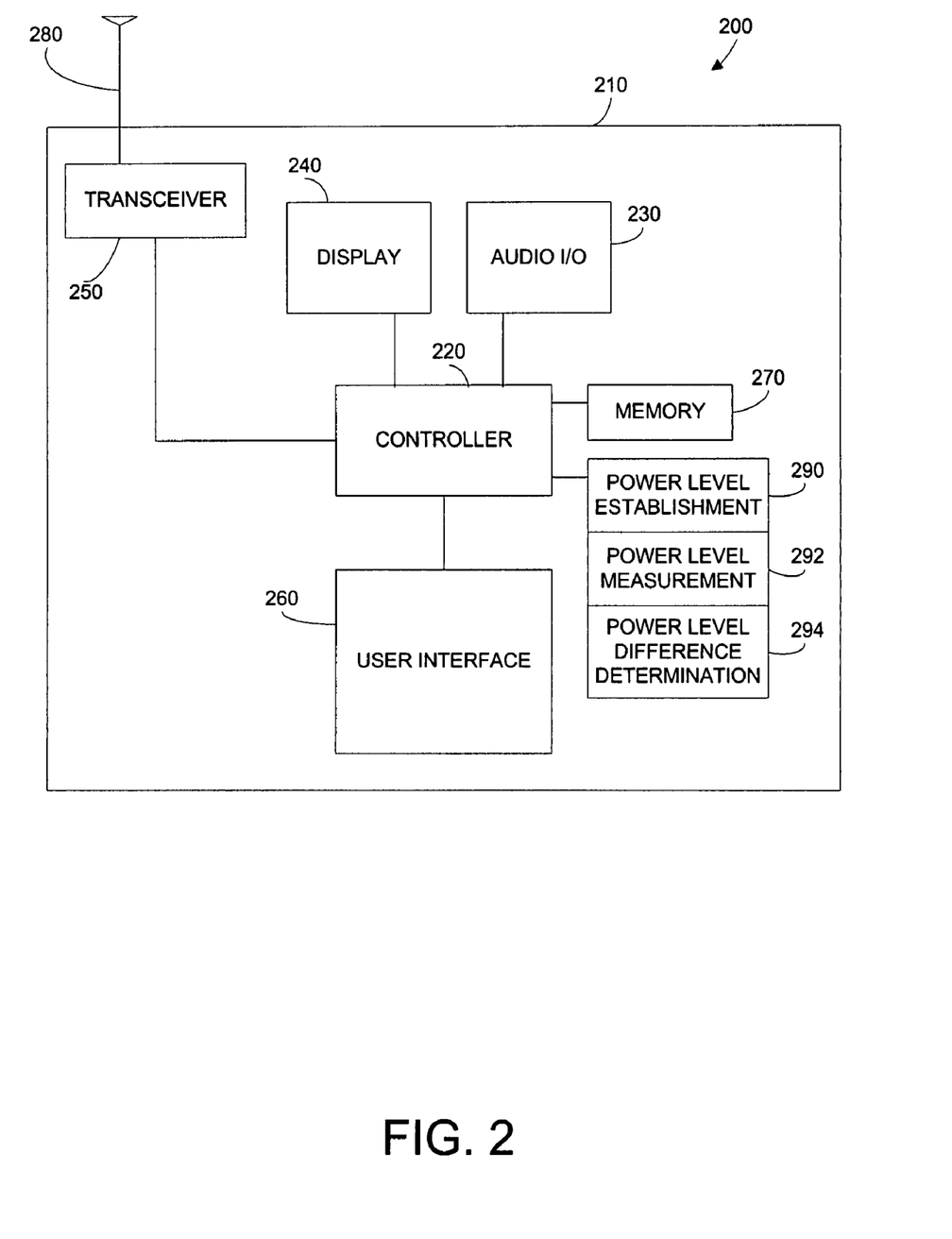
FIG. 2 illustrates an exemplary block diagram of a wireless communication device in accordance with one possible embodiment of the disclosure.

As another example, the terminal 120 can transmit without calibration during the first slot of a subframe, where the subframe may comprise a plurality of slots, but is typically two slots. Due to lack of calibration, the transmit power for that slot could be erroneous. Then, using the measurements made during the first slot, the terminal 120 can correct the transmit power for the remainder of the subframe (i.e. during the second or subsequent slots). As the terminal 120 uses more accurate transmit power for the latter half of the subframe, system performance can be better than not using any calibration at all. Thus, the terminal 120 can transmit at a more accurate power level without utilizing any additional system resources for calibration. More generally, the terminal 120 may—based on prior observations over a specific sub-interval or an interval of time—adjust its transmit power level over one or more subsequent sub-intervals FIG. 2 is an exemplary block diagram of a wireless communication device 200, such as the terminal 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250. The wireless communication device 200 can also include a power level establishment module 290, a power level measurement module 292, and a power level difference determination module 294. The power level establishment module 290, the power level measurement module 292, and the power level difference determination module 294 can be coupled to the controller 220, can reside within the controller 220, can reside within the memory 270, can be autonomous modules, can be software, can be hardware, or can be implemented in any other form useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device.

In operation, the controller 220 can control the operations of the wireless communication device 200. The transceiver 250 can receive an uplink scheduling grant at a user equipment in a frequency division multiplexed wireless system. The power level establishment module 290 can establish a desired power level based on at least the uplink scheduling grant and set hardware power settings based on the desired power level. The desired power level can be determined from the power control function and commands received from the network or base station (e.g. from scheduling grants). The wireless communication device 200 can set a transmitter gain level that it determines will achieve the desired power level but due to the limitations mentioned previously (temperature, load impedance, bandwidth variation and frequency location in carrier bandwidth, supply voltage, etc) the actual power level can be offset by significant amount, e.g. +/−5 dB. The transceiver 250 can then transmit data in a first subframe at a first power level based on the hardware power settings. The power level measurement module 292 can measure the first power level in the first subframe. The power level difference determination module 294 can to determine a difference between the desired power level and the measured first power level. The power level establishment module 290 can then modify the hardware power settings based on the difference. The transceiver 250 is can then transmit at a second power level based on the modified hardware power settings in a next transmission corresponding to the transmission in the first subframe.

The desired power level can be based on at least the uplink scheduling grant by being based on a path loss transmit power control command related to the uplink scheduling grant. For example, a terminal 120 can determine its desired power level from an open loop power control algorithm, which is based partly on a pathloss measurement and also uses power control commands sent on scheduling grants. In addition, the allocation bandwidth indicated on the scheduling grant will also be used to determine a terminal's desired transmit power level.

The power level establishment module 290, the power level measurement module 292, and the power level difference determination module 294 can operate to calibrate the power of the wireless communication device 200 instead of the transceiver transmitting a dedicated power calibration waveform to calibrate the power of the wireless communication device 200. The power level establishment module 290 can save, after the power level measurement module 292 measures the first power level, hardware power settings related to the first power level and modify, after the power level difference determination module determines a difference, the saved hardware power settings based on the difference. The next transmission can correspond to the transmission in a previous subframe by being transmitted under substantially similar conditions corresponding to the desired power level.

Figure 3:
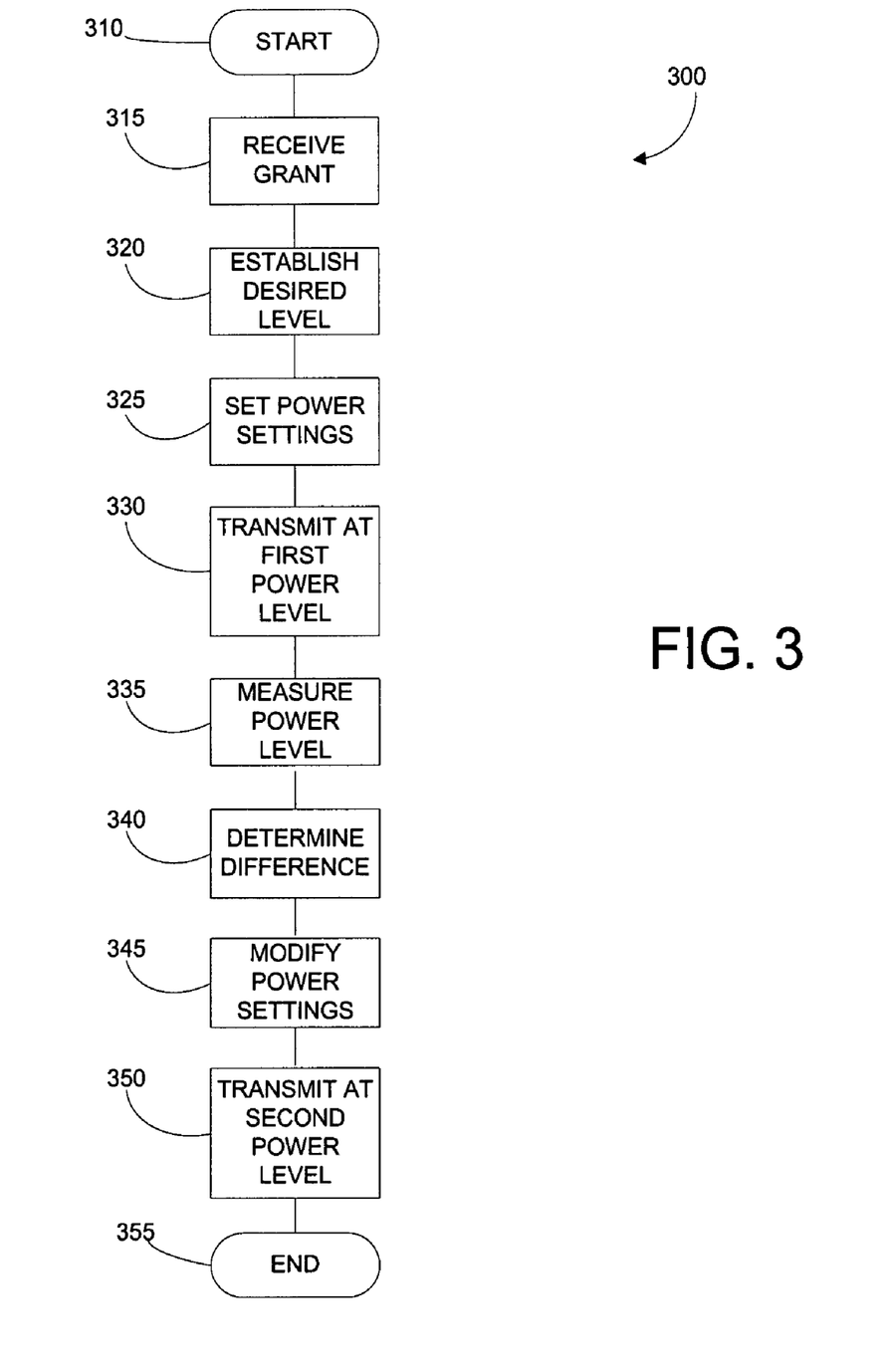
FIG. 3 is an exemplary flowchart illustrating the operation of a wireless communication device in accordance with one possible embodiment of the disclosure.

FIG. 3 is an exemplary flowchart 300 illustrating the operation of the wireless communication device 200 according to another embodiment. In step 310, the flowchart begins. In step 315, the wireless communication device 200 can receive an uplink scheduling grant in a frequency division multiplexed wireless system. The uplink signaling grant may include a power calibration bit which enables the terminal to modify its uplink transmission based on measurement made on previous transmissions.

In step 320, the wireless communication device 200 can establish a desired power level based on at least the uplink scheduling grant (e.g. based on transmit power control commands and resource allocation bandwidth as indicated by the uplink scheduling grant). The desired power level can be based on at least the uplink scheduling grant by being based on a path loss transmit power control command related to the uplink scheduling grant. For example, a power control function may use path loss estimates that the wireless communication device 200 measures based on a known downlink common reference symbol power level along with the resource allocation bandwidth and indicate power control (step) commands to determine a desired power level. The steps after establishing a desired power level can be performed instead of transmitting a dedicated power calibration waveform.

In step 325, the wireless communication device 200 can set hardware power settings based on the desired power level. In step 330, the wireless communication device 200 can transmit data in a first subframe at a first power level based on the hardware power settings. In step 335, the wireless communication device 200 can measure the first power level in the first subframe. When measuring the first power level, the wireless communication device 200 can save hardware power settings related to the first power level. In step 340, the wireless communication device 200 can determine a difference between the desired power level and the measured first power level. In step 345, the wireless communication device 200 can modify the hardware power settings based on the difference. The wireless communication device 200 can modify the power settings by modifying, after determining a difference, the saved hardware power settings based on the difference.

In step 350, the wireless communication device 200 can transmit at a second power level based on the modified hardware power settings for a next transmission that corresponds to a transmission in the first subframe. It is envisioned that that next transmission could correspond to the previous transmission in a number of different ways. For example, the next transmission can correspond to the transmission in the first subframe by having approximately the same frequency location in the carrier bandwidth (i.e. same band location) used for the transmission in the first subframe. That is, the center of the resource allocation of the next transmission is relatively close to that of the first transmission. The next transmission can correspond to the transmission in the first subframe by being in a band location that falls within a resource allocation bandwidth of the transmission in the first subframe. For example, if a wireless communication device transmits in the lower 1.08 MHz band of a 5 MHz carrier given it has received a resource allocation with bandwidth of 1.08 MHz (i.e. six resource blocks where each spans 180 kHz) then if a subsequent transmission or retransmission of a packet occurs in the next few subframes or occuring on the next occurrence of a HARQ channel for a given HARQ process based on a N-channel stop and wait protocol and the new transmission or retransmission resource allocation bandwidth substantially overlaps or falls within the previous 1.08 MHz transmission then the new transmission or retransmission corresponds to the 1.08 MHz transmission. The next transmission can correspond to the transmission in the first subframe by being in a next slot from the transmission in the first subframe. Note that a subframe can be composed of two slots. The next transmission can correspond to the transmission in the first subframe by having the same hybrid automatic repeat request (HARQ) process such that it is transmitted N subframes after the transmission in the first subframe. The next transmission can correspond to the transmission in the first subframe by being in a subsequent subframe used for a control channel related to the transmission in the first subframe. The next transmission can correspond to the transmission in the first subframe by being transmitted within a predetermined time interval from the transmission in the first subframe. The next transmission can correspond to the transmission in the first subframe by being transmitted under substantially similar conditions corresponding to the desired power level. Substantially similar conditions can include temperature conditions, voltage conditions, load impedance conditions, total power conditions, allocation bandwidth conditions, and/or band location conditions. For example, the wireless communication device 200 can determine that the conditions are substantially similar to determine that the next transmission corresponds to the transmission in the first subframe. The next transmission can correspond to the transmission in the first subframe by being in a next symbol used for a sounding reference signal related to the transmission in the first subframe.

Figure 4:
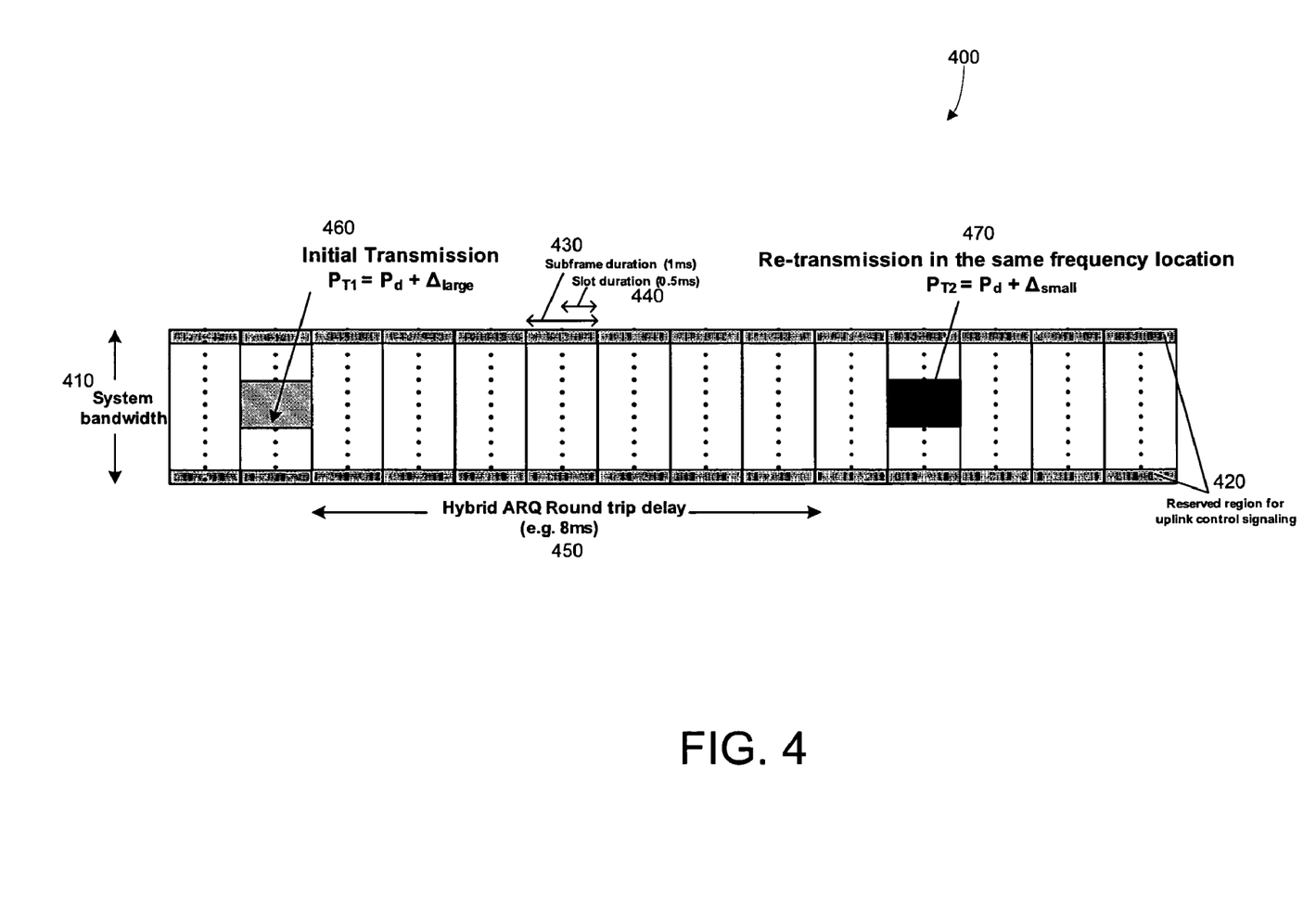
FIG. 4 is an exemplary illustration of a scenario for terminal calibration in accordance with one possible embodiment of the disclosure.

FIG. 4 is an exemplary illustration of a scenario 400 for a terminal calibration according to one embodiment. The scenario 400 shows system bandwidth 410 that can be allocated for different terminals with respect to time. Bandwidth can also be allocated for uplink control signaling 420. The time period can be broken into subframes 430 which can be broken into slots 440. For example, each subframe can be 1 ms and each slot can be 0.5 ms, although those skilled in the art will recognize the size and relationships of the slots can have different values as required by different systems.

Typically, it is envisioned that a measured power determined for a previous transmission can be used to adjust a current transmission. However, it will be recognized that if the conditions of the current transmission are too dissimilar to the conditions of a previous transmission, (e.g. time elapsed since previous transmission is greater than a threshold, or temperature has changed significantly) and default settings can be used for the current transmission such that no power adjusts would be made based on previous measurements. Also, it is envisioned that terminal 120 can transmit a single isolated subframe or multiple subframes within a transmission. It is further envisioned that a resource block (RB) allocation can vary from subframe to subframe, regardless of whether the subframes are isolated or consecutive. Although the power output, the number of RBs, and the RB location within a band can vary significantly from one subframe to the next, the terminal 120 can take advantage of certain patterns or similarities in the transmissions to control power levels.

A Long Term Evolution (LTE) uplink can use synchronous non-adaptive HARQ retransmissions. This can cause the frequency resource allocation of retransmissions to be identical to that used for the initial transmission. When using HARQ transmissions there may be a round trip delay 450 between transmissions. In this example, the round trip delay is exemplified to be 8 ms, but the delay can vary depending on the network and conditions.

In operation, the terminal 120 can transmit an initial transmission 460 at a power level ($P_{T1}$) without any calibration for the entire duration of the subframe. Due to lack of calibration, transmit power for that subframe can be erroneous. However, while making the transmission, terminal hardware can measure the actual power used and save the corresponding hardware settings. In a subsequent retransmission 470 in a subframe, the terminal can then use the saved hardware settings with slight modifications to correct for the error ($\Delta_{large}$) and transmit at a power closer to desired power ($P_d$) with a possible smaller error ($\Delta_{small}$).

Figure 5:
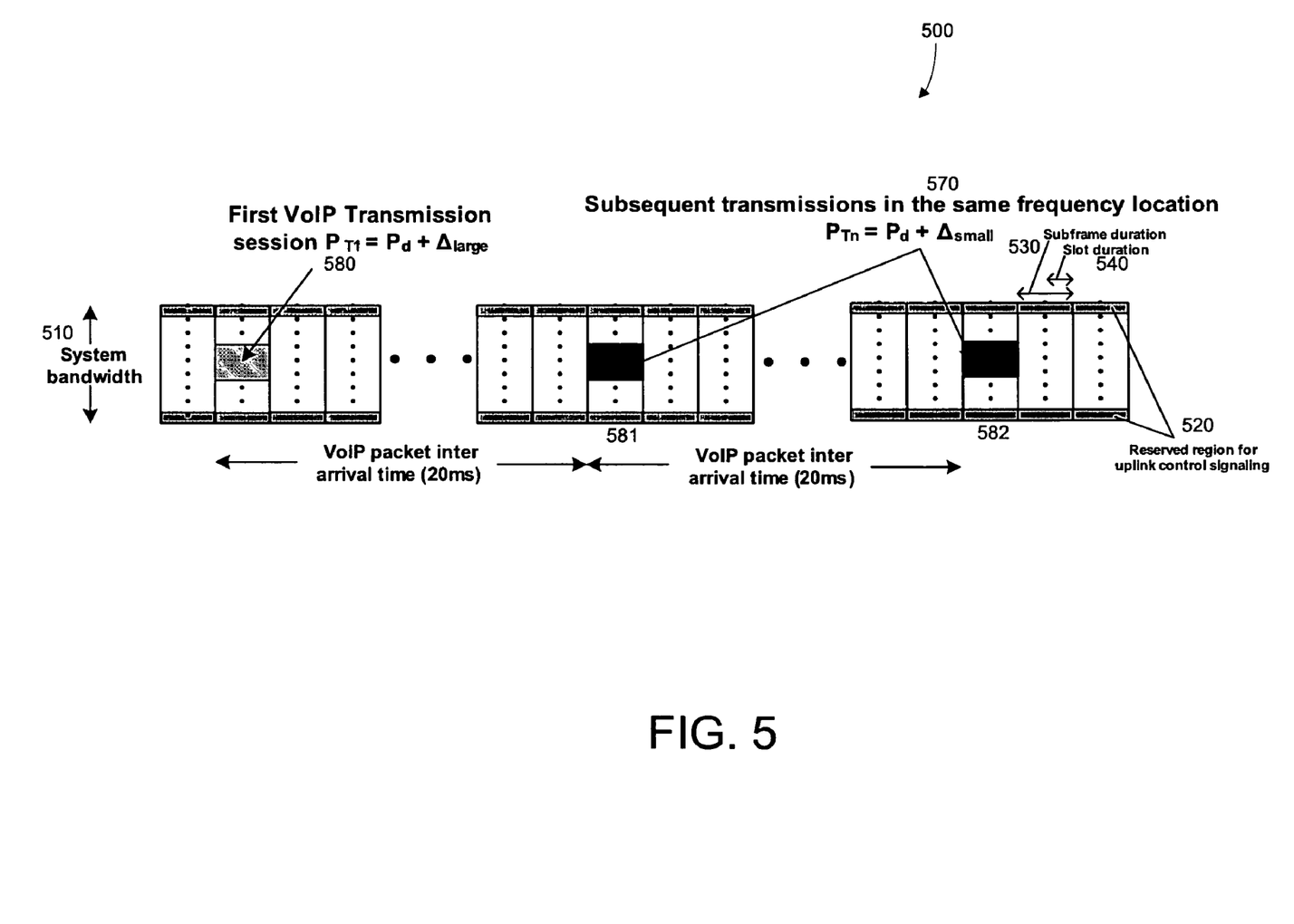
FIG. 5 is an exemplary illustration of a scenario for terminal calibration in accordance with another possible embodiment of the disclosure.

FIG. 5 is an exemplary illustration of a scenario 500 for a terminal calibration according to another embodiment. The scenario 500 shows system bandwidth 510 that can be allocated for different terminals with respect to time. Bandwidth can also be allocated for uplink control signaling 520. The time period can be broken into subframes 530, which can be further divided into slots 540.

In operation, a wireless Voice Over Internet Protocol (VoIP) uplink transmission can feature a repeating pattern of fixed bandwidth transmissions. Uplink acknowledgement/negative acknowledgement (ACK/NACK) and Channel Quality Indicator (CQI) transmissions can also be interspersed with the uplink VoIP activity and these transmissions can occur in the narrower band edge region reserved for uplink control signaling 520.

Signal-to-Noise Ratio (SNR) performance requirements can dictate the terminal 120 produce approximately the same power per subcarrier for each type of transmission (VoIP or ACK/NACK), whereas the total power in the VoIP transmissions can be higher than other signal types absent this dictate, necessitating a power offset from the power used for ACK/NACK transmissions. Transmissions may be done either in the control resources or the data resources but typically not both. Attempting to measure the power in an initial subframe n, and then setting it to a particular target for a later subframe n+1, can induce additional errors due both to the nominal power offset, as well as the frequency offset between the two different transmissions. Where subframes n 580, n+20 581, and n+40 582 are all of the same transmission type, the measured power ($P_{T1}$) in the subframe 580 can be treated as the desired power ($P_d$) and an error ($\Delta_{large}$), such that the determined error can be used to set a much more accurate power value ($P_{Tn}$) to produce a smaller error ($\Delta_{small}$) for a corresponding subsequent subframe n+20 581. Similarly measurements in the later subframe n+20 581 can be used to further improve transmit power accuracy in even later subframes n+40 582. To the extent that parameters affecting transmit gain, such as power, temperature, supply voltages, frequency, and/or loading, are similar between corresponding subframes, the power setting accuracy can be much improved in this manner. Thus, using corresponding subframes for power control can greatly improve the power control accuracy. The transmissions need not be consecutive to use this technique. There can be gaps with no transmissions in between corresponding subframes and power control accuracy can still be improved.

Figure 6:
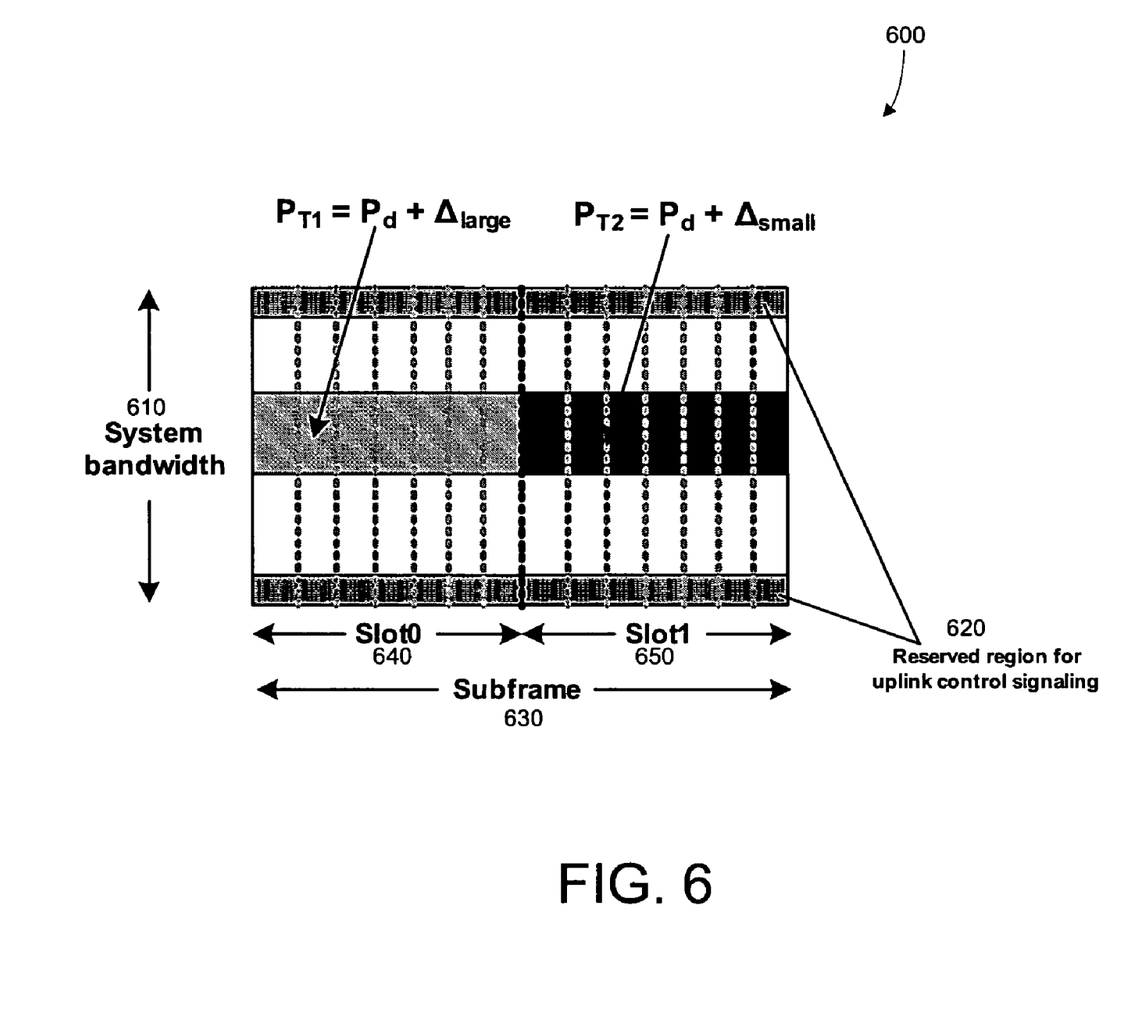
FIG. 6 is an exemplary illustration of a scenario for terminal calibration in accordance with another possible embodiment of the disclosure.

FIG. 6 is an exemplary illustration of a scenario 600 for a terminal calibration according to another embodiment. The scenario 600 shows system bandwidth 610 that can be allocated for different terminals with respect to time. Bandwidth can also be allocated for uplink control signaling 620. The time period can be broken into subframes 630, which can further partitioned into slots 640 and 650.

In operation, the terminal 120 can transmit without calibration during a first slot 640 of the subframe 630. Due to lack of calibration, transmit power ($P_{T1}$) for that slot could be different ($\Delta_{large}$) from the desired transmit power ($P_d$). Using the measurements made during the first slot 640, the terminal 120 can correct the transmit power ($P_{T2}$) for the remainder of the subframe 630. Because the new transmit power ($P_{T2}$) may still include a small error ($\Delta_{small}$), further corrections may be made in later subframes. As the terminal 120 uses more accurate transmit power for the latter half of the subframe, system performance can be better than not using any calibration at all.

In an alternative embodiment, the terminal 120 can make a random access channel (RACH) transmission without calibration Due to lack of calibration, transmit power ($P_{T1}$) for that initial transmission could be different (by an error $\Delta_{large}$) from the desired transmit power ($P_d$). Using the measurements made during the initial transmission the terminal 120 can correct the transmit power ($P_{T2}$) for the subsequent transmissions so that they have a smaller error ($\Delta_{small}$), further corrections may be made based on these subsequent transmissions.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in a user equipment, the method comprising:
receiving an uplink scheduling grant at the user equipment in a frequency division multiplexed wireless system, where the uplink scheduling grant is received from a base station;
establishing, at the user equipment, a desired power level based on at least the uplink scheduling grant;
setting hardware power settings, at the user equipment, based on the desired power level;
transmitting, by the user equipment, in a first subframe at a first power level based on the hardware power settings;
measuring, at the user equipment, the first power level in the first subframe;
determining, by the user equipment, a difference between the desired power level and the measured first power level;
modifying, by the user equipment, the hardware power settings based on the difference; and
transmitting, by the user equipment, at a second power level based on the modified hardware power settings in a next transmission corresponding to the transmission in the first subframe.

2. The method according to claim 1, wherein the desired power level is based on at least the uplink scheduling grant by being based on a path loss transmit power control command related to the uplink scheduling grant.

3. The method according to claim 1, further comprising saving, after measuring the first power level, hardware power settings related to the first power level,
wherein modifying comprises modifying, after determining a difference, the saved hardware power settings based on the difference.

4. The method according to claim 1, further comprising, wherein the desired power level of the next transmission is the same or has a known difference with respect to the desired power level of the first transmission.

5. The method according to claim 1, wherein the next transmission corresponds to the transmission in the first subframe by being in a same band location as the band location used for the transmission in the first subframe.

6. The method according to claim 1, wherein the next transmission corresponds to the transmission in the first subframe by being in a band location that falls within a resource allocation bandwidth of the transmission in the first subframe.

7. The method according to claim 1, wherein the next transmission corresponds to the transmission in the first subframe by being in a next slot from the transmission in the first subframe.

8. The method according to claim 1, wherein the next transmission corresponds to the transmission in the first subframe by being in a subsequent subframe corresponding to a hybrid automatic repeat request process related to the transmission in the first subframe.

9. The method according to claim 1, wherein the next transmission corresponds to the transmission in the first subframe by being in a subsequent subframe used for a control channel related to the transmission in the first subframe.

10. The method according to claim 1, wherein the next transmission corresponds to the transmission in the first subframe by being transmitted within a predetermined time interval from the transmission in the first subframe.

11. The method according to claim 1, wherein the next transmission corresponds to the transmission in the first subframe by being transmitted under similar conditions corresponding to the desired power level.

12. The method according to claim 11, wherein similar conditions comprise at least one selected from the set of temperature conditions, voltage conditions, load impedance conditions, total power conditions, allocation bandwidth conditions, and band location conditions.

13. The method according to claim 1, wherein the next transmission corresponds to the transmission in the first subframe by being in a next symbol used for a sounding reference signal related to the transmission in the first subframe.

14. The method according to claim 1, wherein receiving an uplink scheduling grant further comprises receiving an uplink scheduling grant at a user equipment in a frequency division multiplexed wireless system, the uplink signaling grant including a power calibration bit.

15. An apparatus comprising:
a transceiver configured to receive an uplink scheduling grant at a user equipment in a frequency division multiplexed wireless system where the uplink scheduling grant is received at the user equipment from a base station;
a controller coupled to the transceiver at the user equipment, the controller configured to control the operations of the apparatus;
a power level establishment module at the user equipment, the power level establishment module configured to establish a desired power level based on at least the uplink scheduling grant and set hardware power settings based on the desired power level, wherein the transceiver is configured to transmit data in a first subframe at a first power level based on the hardware power settings;
a power level measurement module at the user equipment, the power level measurement module configured to measure the first power level in the first subframe; and
a power level difference determination module at the user equipment, the power level difference determination module configured to determine a difference between the desired power level and the measured first power level, wherein the power level establishment module is configured to modify the hardware power settings based on the difference,
wherein the transceiver is configured to transmit at a second power level based on the modified hardware power settings in a next transmission corresponding to the transmission in the first subframe.

16. The apparatus according to claim 15, wherein the desired power level is based on at least the uplink scheduling grant by being based on a path loss transmit power control command related to the uplink scheduling grant.

17. The apparatus according to claim 15, wherein the power level establishment module, the power level measurement module and the power level difference determination module operate to calibrate the power of the apparatus instead of the transceiver transmitting a dedicated power calibration waveform to calibrate the power of the apparatus.

18. The apparatus according to claim 15, wherein the power level establishment module is configured to save, after the first power level is measured, hardware power settings related to the first power level and modify, after the difference is determined, the saved hardware power settings based on the difference.

19. The apparatus according to claim 15, wherein the next transmission corresponds to the transmission in the first subframe by being transmitted under similar conditions corresponding to the desired power level.

20. A method comprising:

receiving an uplink scheduling grant at a user equipment and from a base station in a frequency division multiplexed wireless system;

establishing, at the user equipment, a desired power level based on at least the uplink scheduling grant;

setting, by the user equipment, hardware power settings based on the desired power level;

transmitting data, from the user equipment, in a first subframe at a first power level based on the hardware power settings without any calibration based on a dedicated power calibration waveform;

measuring, at the user equipment, the first power level in the first subframe;

saving, at the user equipment, hardware power settings related to the first power level;

determining, at the user equipment, a difference between the desired power level and the measured first power level;

modifying, by the user equipment, the saved hardware power settings based on the difference; and transmitting, from the user equipment, at a second power level based on the modified hardware power settings in a next transmission corresponding to the transmission in the first subframe based on similar characteristics corresponding to characteristics for the transmission in the first subframe.

* * * * *